Figure 1:
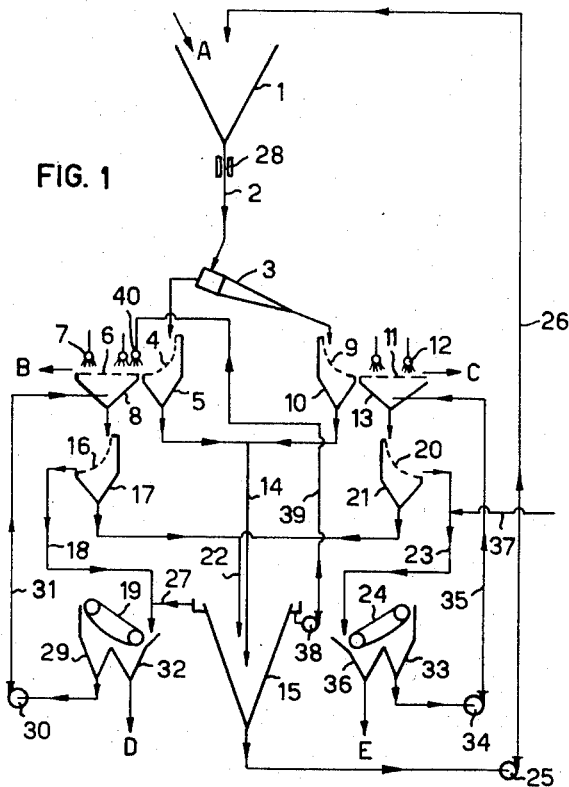

Nov. 18, 1958     F. J. FONTEIN     2,860,782

PROCESS FOR SEPARATING A MIXTURE OF SOLID PARTICLES

Filed Jan. 25, 1957

FREERK J. FONTEIN

BY: Cushman, Darby & Cushman
ATTORNEYS

United States Patent Office 2,860,782
Patented Nov. 18, 1958

2,860,782

PROCESS FOR SEPARATING A MIXTURE OF SOLID PARTICLES

Freerk J. Fontein, Heerlen, Netherlands, assignor to Stamicarbon N. V., Heerlen, Netherlands Application January 25, 1957, Serial No. 636,333

Claims priority, application Netherlands January 27, 1956

7 Claims. (Cl. 209—172.5)

This invention relates to a process for separating particles of solid material into fractions according to specific gravity by means of a separating suspension consisting of magnetisable particles.

It is a known procedure, e. g., in coal washing, to separate particles into fractions of different specific gravities in a hydrocyclone separator using a liquid suspension of magnetisable particles as separating medium. In such a system, it has been proposed for recovering and regenerating separating medium, to rinse the separated fractions on screeens of fairly coarse mesh to remove adhering magnetisable suspension particles and after subjecting the resulting dilute suspension to a finer screening treatment for the purpose of removing coarser non-magnetisable particles, to separate the suspension in a static thickener into a thickened fraction of magnetisable particles which is returned for use in the hydrocyclone separator and an overflow fraction containing very fine non-magnetisable particles, at least part of which is bled from the system.

The overflow fraction from the thickener comprises those very fine non-magnetisable particles which are too small to settle in the thickener and as the minimum size at which the particles will settle is well below the size at which the suspension is screened preparatory to entering the thickener there remains a fraction of non-magnetisable particles of an intermediate size range which are returned to the main separator with the thickened separating suspension. The quantity of these particles in this intermediate size range will tend to build up in the system as more particles of a like size enter the system with the feed, and as a result the viscosity of the separating suspension increases and the accuracy of the separation becomes impaired, particularly for the fine particles. In consequence it may be necessary to screen the initial material before it is fed to the hydrocyclone separator in order to remove a fine fraction including those particles which would otherwise accumulate in the hydrocyclone washing circuit, and to wash this fine fraction separately by froth flotation. This procedure involves a number of disadvantages. In the first place, the screens for desliming the feed are subject to heavy wear and require frequent replacement. Furthermore, the coarse material retained by the desliming screens requires to be rinsed off and will therefore have a substantial water content. Consequently in the suspension regenerating circuit associated with the hydrocyclone washer the separating suspension will have to be thickened to a high solids concentration to compensate for the continuous dilution effected by the water coming in with the fresh material to be separated.

It is therefore an object of the present invention to provide a novel process for separating mixtures of particles according to specific gravity in which the whole mixture can be effectively treated in one separator.

Another object of the present invention is the provision of an improved process for separating mixtures of particles according to specific gravity wherein the viscosity of the separating suspension in the separator is kept at a low value.

A further object of the present invention is the provision of a process of the type described wherein a thickener may be used of small dimensions.

A still further object of the present invention is the provision of a process of the type described wherein the losses of suspension medium are very low.

To this end I propose to avoid or reduce the recirculation of fine non-magnetisable particles to the hydrocyclone separator by operating with such a volume rate of feed of liquid to the thickener in relation to the designed capacity of the thickener that the thickener is overloaded. This overloading may be secured simply by employing a thickener of smaller dimensions than are required for carrying out the process in the old manner, or by feeding in additional liquid, or by a combination of these measures, the aim in any case being to establish such an overflow current in the thickener as to ensure that in the course of the process there will be no accumulation of non-magnetisable particles in the circulating separating suspension. In attaining this result, a significant proportion of magnetisable particles will become discharged in the overflow from the thickener. I propose therefore to pass at least part of the overflow into a magnetic separator and to return the magnetisable particles so recovered for re-use in the system, e. g., in the hydrocyclone separator. In view of this magnetic recovery of suspension particles from the overflow of the thickener, there is no objection to an appreciable proportion of magnetisable particles overflowing from the thickener and accordingly it is possible to employ a thickener of considerably smaller size than in previous practice where it has been necessary to ensure that the thickener has a large clarifying surface to allow substantially all the magnetisable particles to sink.

The reference to "a hydrocyclone separator" is to be understood as including a separator comprising a plurality of individual hydrocyclones.

One and the same magnetic separator may if desired be employed for recovering magnetisable particles from the thickener overflow and from coarser particles removed from the throughput of the rinsing screens preparatory to the thickening step. In a coal washing plant wherein the quantities of dilute suspension obtained from the rinsing of the coal and shale fractions are screened separately for removing coarse particles preparatory to thickening, and the resulting coarse fractions are treated separately in magnetic separators, the overflow from the thickener or part thereof should be supplied to the magnetic separator receiving the overflow from the fine coal screen. In this way the said overflow is diluted and the magnetic separator consequently operates with greater efficiency.

The screening of the dilute suspension obtained as throughput of the rinsing screens is preferably carried out by the method described and claimed in my co-pending application Serial No. 475,251, filed December 14, 1954, according to which a mixture of particles is wet screened by flowing the particles in a liquid medium as a layer over a screen curved along the line of flow. With this method screening may be effected at a very small particle size.

In cases where it is desired to drain the fractions separated in the hydrocyclone before rinsing them, the throughput of the draining screens may be supplied to the thickener but it is preferred to screen the draining suspension for removing coarse particles, at the same particle size as in the case of the dilute suspension obtained from the rinsing screens. If it would involve too high a loading of the draining screens if these were themselves sufficiently fine for this purpose, further screens may be employed for screening the throughput of the draining screens.

In the event that the required stronger current in the thickener is obtained wholly or in part by the introduction of water in excess of that normally required, i. e., in excess of that required in a system wherein substantially all magnetisable particles must be allowed to settle in the thickener, the excess water is advantageously introduced by way of the sprayers of the rinsing screens. In this way the quantity of suspension lost through adherence to the separated fractions is reduced. The quantity of additional water required for obtaining such an improvement will be less than that which would be required for desliming the initial mixture of particles and treating the fine particles separately in a froth flotation apparatus.

The following table compares the results obtained with a thickener firstly when normally loaded and secondly when overloaded by increasing the volume rate of feed of liquid.

|  | Overflow as a percentage of feed | | Discharge as a percentage of feed | |
| --- | --- | --- | --- | --- |
|  | Magnetite | Non-magnetic particles | Magnetite | Non-magnetic particles |
|  |  | 0-100μ \| 100-150μ |  | 0-100μ \| 100-150μ |
| Normally loaded | 0 | 51 \| 18 | 100 | 49 \| 82 |
| Overloaded | 3 | 82 \| 70 | 97 | 18 \| 30 |

This shows how the percentage of non-magnetic particles in the bottom discharge decreases with increase in the loading, whereas the magnetite content of the overflow increases.

The invention may best be understood with reference to the accompanying drawings wherein illustrative embodiments of the invention are shown.

Figure 2:
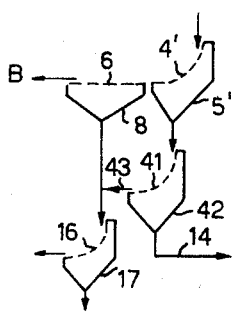

In the drawing:

Figure 1 is a flow sheet of a coal preparation plant embodying the principles of the present invention, and Figure 2 illustrates a detail modification of the said flow sheet.

Referring now more particularly to the drawings, raw coal having a particle size of from 0 to 10 mm. is fed into a tank 1 at A, without the very fine particles having been previously removed. From this tank the material is fed, under pressure together with a magnetite suspension of the desired specific gravity, through a conduit 2 into a conical hydrocyclone 3. The maximum particle size of the magnetite is 100μ. The necessary feed pressure may be obtained by means of a pump or by installing the tank at a certain height above the hydrocyclone. In the hydrocyclone the mixture to be treated is separated into a fraction of washed coal, which together with an amount of magnetite suspension leaves the hydrocyclone through the outlet opening in its wider end and a fraction of washed shales, which issues from the hydrocyclone, likewise together with an amount of the magnetite suspension, through the opening in its apex.

The washed coal is wet screened using a curved bar-screen 4 as described and claimed in my co-pending application Serial No. 475,251. The width the the slots between the bars is 0.3 mm. The underflow from this screen contains, besides liquid, chiefly particles with a diameter smaller than about half of the slot width, i. e., smaller than 150μ. This underflow is received in a tank 5 and the overflow from the screen is passed across a vibrating screen 6 on which the washed coal is rinsed with clean water supplied through sprayers 7, in order to remove adhering suspension particles. The mesh of the rinsing screen is 0.5 mm., so that the dilute suspension entering the collecting tank 8 under the screen contains, in addition to the magnetite particles, non-magnetic particles, mainly coal-particles, up to a particle size of 0.5 mm.

The washed shales are wet screened using a curved bar-screen 9, also by the method claimed in my co-pending application Serial No. 475,251. The screen 9 also has a slot width of 0.3 mm., and undiluted suspension and shale particles smaller than 150μ enter the tank 10. The overflow from the screen 9 is rinsed on vibrating screen 11 with a mesh of 0.5 mm., by means of clean water supplied through sprayers 12, and a dilute suspension containing magnetite particles and non-magnetic particles, mainly shale particles, smaller than 0.5 mm. passes into the tank 13. The washed fractions of coal and shales of from 0.5 to 10 mm. are discharged at B and C, while the undiluted suspension entering tanks 5 and 10 is led to a thickener 15 through a conduit 14.

The dilute suspension contained in tank 8 is wet screened, also by the method according to my co-pending application Serial No. 475,251, on a curved bar-screen 16 which again has a slot width of 0.3 mm. In the tank 17 under this screen a dilute suspension is received which contains non-magnetic particles smaller than 150μ in addition to magnetite. The overflow from the screen contains in addition to non-magnetic particles smaller than 0.5 mm., some magnetite, and it is led through a conduit 18 to a magnetic separator 19, in order that the magnetite may be recovered. The dilute suspension entering tank 13 is wet screened by the same method on a screen 20 with a slot width of 0.3 mm. In the tank 21 under this screen a dilute suspension is collected which contains, in addition to magnetite, non-magnetic particles smaller than 150μ. This dilute suspension, together with the dilute suspension contained in collecting tank 17, is fed into the thickener through a conduit 22. The overflow from the screen 20 is passed through a conduit 23 to a magnetic separator 24 for recovery of the magnetic particles remaining in this overflow.

The thickener 15 is a spitzkasten which, in comparison with the Dorr thickeners normally used for the purpose, has a relatively small diameter. Thickened suspension is drawn off at the apex of this spitzkasten and is pumped back to the tank 1 by a pump 25 through a conduit 26. A large amount of clean water is sprayed onto the screens 6 and 11 and in consequence the volume of liquid feeding into the thickener per unit time is correspondingly high and there is a high rate of overflow across the thickener brim at 27. As the diameter of the thickener is small, such a current is established in the thickener that the particles having a low settling rate, i. e., the non-magnetic particles with sizes up to 150μ are washed across the overflow brim. The magnetite particles have a higher settling rate, in spite of the fact that their diameter is smaller than 100μ. This is due on the one hand to their higher specific gravity, and on the other to their being magnetized so that they agglomerate in the thickener to form clots which settle rapidly. In order to keep the magnetite particles magnetized a coil 28 is placed in conduit 2, through which coil the whole of the suspension must pass. The coil could of course be located at some other place in the system, e. g., in the conduit 26 or a coil could be provided in each feed conduit to the thickener. The fact that the magnetite is in the magnetized state has no influence on the operation of the hydrocyclone washer 3, as, on account of the shearing forces occurring between the rotating liquid layers in the cyclone, the magnetite particles cannot there agglomerate.

In addition to the fine coal and shale particles the overflow from the thickener at 27 contains a proportion of fine magnetite particles which have not been sufficiently magnetized or for some other reason have not become attached to other magnetite particles. Therefore, the overflow is fed into the magnetic separator 19, for recovering these particles. The magnetite separated from the overflow and from the overflow from screen 16 is received in a tank 29, and by means of a pump 30 is transported through a conduit 31 to the collecting tank 8. These magnetite particles can pass again, via screen 16 and collecting tank 17, into the thickener 15. The non-magnetic fraction separated out in the magnetic separator 19 is collected in a tank 32 and discharged at D.

In the magnetic separator 24 the overflow from screen 20 supplied through conduit 23 is separated into a fraction containing the magnetite present in this overflow, and another fraction which contains the shale particles of diameters up to 0.5 mm. The magnetite fraction is received in a tank 33 and transported by means of a pump 34 through a conduit 35 to collecting tank 13. The shales fraction is collected in a tank 36 and removed at E. A conduit 37 is provided for the supply of additional water, so that the feed to the magnetic separator can be diluted.

Various alterations may be made to the embodiment described above. For instance, it is possible to use the magnetite fraction coming from magnetic separators 19 and 24, if necessary after dilution, as spraying liquid for the screens 6 and 11. Also, it is possible, instead of using only clean water for spraying, to rinse the washed fractions first with clarified water or with liquid from the overflow of the thickener, and next with clean water. If liquid from the overflow of the thickener is used for spraying, part of this overflow is forced by a pump 38 through a conduit 39 to sprayers 40 over the screen 6. If spraying is effected with clarified water, this water may be supplied from the dewatering devices for the fractions D and E, which are not shown in the drawing. If the content of very fine particles in the feed allows of doing so, the undiluted suspension contained in collecting tanks 5 and 10 may also be returned in whole or in part to tank 1, without being passed through thickener 15.

As will be seen from the following example, only a small portion of the magnetite suspension to be purified need be treated in the magnetic separators, if the process according to the invention is used. This is a very important advantage of the invention as, on account hereof, the magnetite losses are considerably reduced, while at the same time the amount of non-magnetic particles recirculating together with the magnetite recovered in the separators, is likewise considerably reduced.

EXAMPLE

A coal washery as represented by Figure 1, capable of washing 100 tons of raw coal per hour, of which amount 70 tons is coarser than 0.5 mm. and 30 tons is finer than 0.5 mm., comprised the following apparatus.

Hydrocyclone separator (3): two conical hydrocyclones, largest diameter 350 mm., apex angle 20°, feed pressure 1.7 atm. gauge;
Screening apparatus (4): two curved bar-screens 1500 x 800 mm. curved to subtend an angle of 60°, width of slot between the bars 0.3–0.4 mm.;
Screening apparatus (6): two vibrating screens 4' x 12', width of slot 0.5 mm.;
Screening apparatus (16): two curved bar-screens identical with those forming the screening apparatus 4;
Screening apparatus (9): one curved bar-screen 1000 x 800 mm., curved to subtend an angle of 60°, width of slot between bars 0.3 to 0.4 mm.;
Screening apparatus (11): one vibrating screen 3' x 12', slot width 0.5 mm.;
Screening apparatus (20): identical with screening apparatus 9;
Separation apparatus (19): two magnetic separators, width 4';
Separation apparatus (24): one magnetic separator, width 1';
Thickener (15): one spitzkasten, diameter 3 m.

The following products were obtained:

At B: 50 tons/hr. of coal coarser than 0.5 mm.;
At C: 20 tons/hr. of shales coarser than 0.5 mm.;
At D: 25 tons/hr. of non-magnetic particles, mainly coal smaller than 0.5 mm.;
At E: 5 tons/hr. of non-magnetic particles, mainly shales smaller than 0.5 mm.;
Total: 100 tons/hr. of washed product.

The water balance was as follows:

Feed of clean water to screening apparatus 6: 119 m.³/hr.
Feed of clean water to screening apparatus 11: 35 m.³/hr.
Feed of clean water through conduit 37: 5 m.³/hr.
Total feed: 159 m.³/hr.
Discharged with product B: 15 m.³/hr.;
Discharged with product C: 4 m.³/hr.;
Discharged with product D: 125 m.³/hr.;
Discharged with product E: 15 m.³/hr.

Magnetic separation apparatus 19

Feed 18: 25 tons/hr. of non-magnetic particles, mainly coal, 5 tons/hr. of magnetite, and 40 m.³/hr. of water;
Feed 27 from overflow of thickener: 5 tons/hr. of non-magnetic particles, 1 ton/hr. of magnetite and 100 m.³/hr. of water;
Discharge at D: 25 tons/hr. of non-magnetic particles, mainly coal, and 125 m.³/hr. of water;
Discharge 31: 5 tons/hr. of non-magnetic particles, 6 tons/hr. of magnetite and 15 m.³/hr. of water.

Magnetic separation plant 24

Feed 23: 5.5 tons/hr. of non-magnetic particles, mainly shales, 1.5 tons/hr. of magnetite and 12 m.³/hr. of water;
Feed 37: 5 m.³/hr. of clean water;
Discharge at E: 5 tons/hr. of non-magnetic particles, mainly shales, and 15 m.³/hr. of water;
Discharge 35: 0.5 tons/hr. of non-magnetic particles, 1.5 tons/hr. of magnetite and 2 m.³/hr. of water.

Thickener 15

Feeds 14 and 22: 300 m.³/hr. of water, 151.5 tons/hr. of magnetite, and 10 tons/hr. of non-magnetic particles;
Overflow 27: 100 m.³/hr. of water, 1 ton/hr. of magnetite and 5 tons/hr. of non-magnetic particles;
Overflow 39: 50 m.³/hr. of water, 0.5 tons/hr. of magnetite, and 2.5 tons/hr. of non-magnetic particles;
Discharge 26: 150 m.³/hr. of water, 150 tons/hr. of magnetite, and 2.5 tons/hr. of non-magnetic particles.

In the example given above the total amount of product is led over the fine screens 4 and 9, in order to prevent coarse non-magnetic particles being returned into the separation circuit together with the undiluted suspension.

Figure 2 shows an embodiment with which the same results are obtained without the total amount of separated particles being passed across the fine screens. The separated coal is in this case supplied to a curved bar-screen 4' (according to my co-pending application Serial No. 495,251) having a slot width of 1 mm. The overflow from this screen goes to rinsing screen 6, and the fraction collected in the collecting tank 5', which contains, besides magnetite, fine coal particles smaller than 0.5 mm., is lead over a curved bar-screen 41, having a slot width of 0.3 mm. In this case the fine screen is not loaded by the 50 tons/hr. of coarse coal discharged at B. The underflow of screen 41 which, contains, in addition to magnitude, non-magnetic particles smaller than 150μ, is collected in a collecting tank 42 and, as described above, passed on to thickener 15 through conduit 14. The overflow 43 from the finer screen may be fed directly into the magnetic separator 19 or, as shown in Figure 2, passed, together with the dilute suspension from collecting tank 8, over the screen 16. Naturally, the shales fraction may also be drained on successive screens in the same manner.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

I claim:

1. A continuous separation process comprising the steps of separating a mixture of solid particles into fractions in accordance with specific gravity in a hydrocyclone with the aid of a separating suspension of fine magnetizable particles in liquid, rinsing the separated fractions on rinsing screens to remove adhering magnetizable particles therefrom, the throughput of the rinsing screens constituting separating suspension diluted by rinse liquid and containing some non-magnetic particles, screening said diluted suspension to remove relatively coarse non-magnetic particles therefrom, supplying said diluted and screened suspension to a static thickener yielding a dilute overflow fraction and a thickened suspension of magnetizable particles at such a rate that the thickener is overloaded, whereby a major portion of the remaining non-magnetic particles are discharged in the dilute overflow fraction together with a minor portion of the fine magnetizable particles, supplying at least part of said dilute overflow fraction to a magnetic separator to recover magnetizable particles therefrom, and recycling the recovered magnetizable particles into the system.

2. A process as defined in claim 1 in which the fractions separated by the hydrocyclone separator are drained before they are rinsed.

3. A process as defined in claim 1 in which the fractions separated by the hydrocyclone separator are drained on comparatively coarse screens before they are rinsed, and the drainings from said coarse screens are further screened on relatively fine screens.

4. A process as defined in claim 1 wherein the static thickener is overloaded at least in part by excess water introduced in the rinsing step.

5. A process as defined in claim 1 wherein the relatively coarse non-magnetic particles removed in the screening step are also supplied to said magnetic separator to recover magnetizable particles therefrom.

6. A process as defined in claim 1 wherein the initial mixture of solid particles constitutes raw coal.

7. A process as defined in claim 1 wherein the recovered magnetizable particles are recycled to the diluted suspension resulting from the rinsing step.

References Cited in the file of this patent

UNITED STATES PATENTS

| | | |
|---|---|---|
| 2,690,261 | Maust | Sept. 28, 1954 |
| 2,781,906 | Fontein | Feb. 19, 1957 |